United States Patent
Chen

(10) Patent No.: US 8,662,005 B2
(45) Date of Patent: Mar. 4, 2014

(54) POINTER GAUGE SURFACE STRUCTURE WITH A MOVABLE ALARM ADJUSTMENT MARK

(75) Inventor: Li-Chen Chen, Bade (TW)

(73) Assignee: Hwa Chi Technology Co., Ltd., Taoyuan County (TW)

( * ) Notice: Subject to any disclaimer, the term of this patent is extended or adjusted under 35 U.S.C. 154(b) by 349 days.

(21) Appl. No.: 13/042,540

(22) Filed: Mar. 8, 2011

(65) Prior Publication Data

US 2011/0226177 A1    Sep. 22, 2011

(30) Foreign Application Priority Data

Mar. 19, 2010  (TW) .............................. 99204808 U

(51) Int. Cl.
*G01D 13/24*   (2006.01)
*G01L 19/10*   (2006.01)

(52) U.S. Cl.
USPC ........................... 116/291; 116/305; 116/323

(58) Field of Classification Search
USPC ......... 116/291, 296, 300, 304, 305, 321, 322, 116/323, 324, 327, 328, 332, DIG. 6; 73/866.3; D10/102, 103
See application file for complete search history.

(56) References Cited

U.S. PATENT DOCUMENTS

| | | | | | |
|---|---|---|---|---|---|
| 2,707,931 | A | * | 5/1955 | Croshier et al. | 116/296 |
| 3,045,638 | A | * | 7/1962 | Davio | 116/306 |
| 3,061,963 | A | * | 11/1962 | Buckley, Jr. | 40/389 |
| 3,086,493 | A | * | 4/1963 | Bullard, III | 116/231 |
| 3,203,391 | A | * | 8/1965 | Corwin | 116/308 |
| 4,020,787 | A | * | 5/1977 | Castro et al. | 116/300 |
| 4,195,589 | A | * | 4/1980 | Blattner | 116/212 |
| 5,011,032 | A | * | 4/1991 | Rollman | 215/230 |
| 5,483,838 | A | * | 1/1996 | Holden | 73/861.61 |
| 5,765,501 | A | * | 6/1998 | Tung et al. | 116/323 |
| 5,979,356 | A | * | 11/1999 | Emery | 116/324 |
| 6,415,672 | B1 | * | 7/2002 | Hamilton et al. | 73/866.3 |
| 6,718,907 | B2 | * | 4/2004 | Kao | 116/300 |
| 8,033,239 | B2 | * | 10/2011 | Chen | 116/321 |

FOREIGN PATENT DOCUMENTS

EP     978246 A1 *  2/2000 ............. A47J 47/02

* cited by examiner

*Primary Examiner* — R. A. Smith
(74) *Attorney, Agent, or Firm* — Chun-Ming Shih

(57) ABSTRACT

A pointer gauge surface structure with an indication mark. A mark member is coupled on the surface of a pressure gauge or a micro-differential pressure gauge to display a critical value for a person to read with ease. A circumferential portion of a transparent casing is provided with a slide rail for engagement and slide of the mark member. The mark member has a C-shaped cross-section to provide a tightening function relative to the slide rail.

6 Claims, 6 Drawing Sheets

POINTER GAUGE SURFACE STRUCTURE WITH A MOVABLE ALARM ADJUSTMENT MARK

BACKGROUND OF THE INVENTION

1. Field of the Invention

The present invention relates to a pointer gauge surface structure, in particular, a pointer gauge surface structure having an indication mark member which is coupled to a transparent casing.

2. Description of the Prior Art

A conventional gauge, such as a micro-differential pressure gauge or a pressure gauge, includes a pointer therein. The pointer is rotated according to the pressure. In conjunction with a numeral scale plate in the gauge, the user can read the value. In general, the gauge is set with a security value. For the user to know whether or not the pointer is in the range of safety, the gauge is provided with a safety mark. The conventional mark is secured on an outer edge of the gauge. When the gauge has to be installed in an embedded way, such as in a hole of a flat board of an apparatus, the mark cannot be attached to the gauge because the circumferential edge of the gauge is tightly against the flat board. Accordingly, the inventor of the present invention has devoted himself based on his many years of practical experiences to solve this problem.

SUMMARY OF THE INVENTION

The primary object of the present invention is to provide a pointer gauge surface structure with an indication mark. A mark member is disposed on a transparent casing, which doesn't exceed the circumference of the gauge, such that the mark member can be coupled to the gauge which is installed in an embedded way.

In order to achieve the aforesaid object, a circumferential portion of the transparent casing is provided with a slide rail for engagement and slide of the mark member.

Preferably, the mark member has a C-shaped cross-section to provide a tightening function relative to the slide rail.

Preferably, the mark member is composed of a first board, a second board and a third board. The first board is not parallel to the second third board. The distance between outer ends of the first board and the third board is smaller than the distance between inner ends of the first board and the third board.

Preferably, the transparent casing further has a slide groove formed under the slide rail for insertion of the third board.

Preferably, when the mark member is coupled to the slide rail, the first board of the mark member is against an upper side of the slide rail, and the second board is against an outer side of the slide rail, and the third board is against a lower side of the slide rail. The first board and the third board are used to clamp the slide rail.

Preferably, the mark member is colored, such as red.

Preferably, the first board of the mark member has a pointed end.

DETAILED DESCRIPTION OF THE PREFERRED EMBODIMENTS

Embodiments of the present invention will now be described, by way of example only, with reference to the accompanying drawings.

Figure 1:
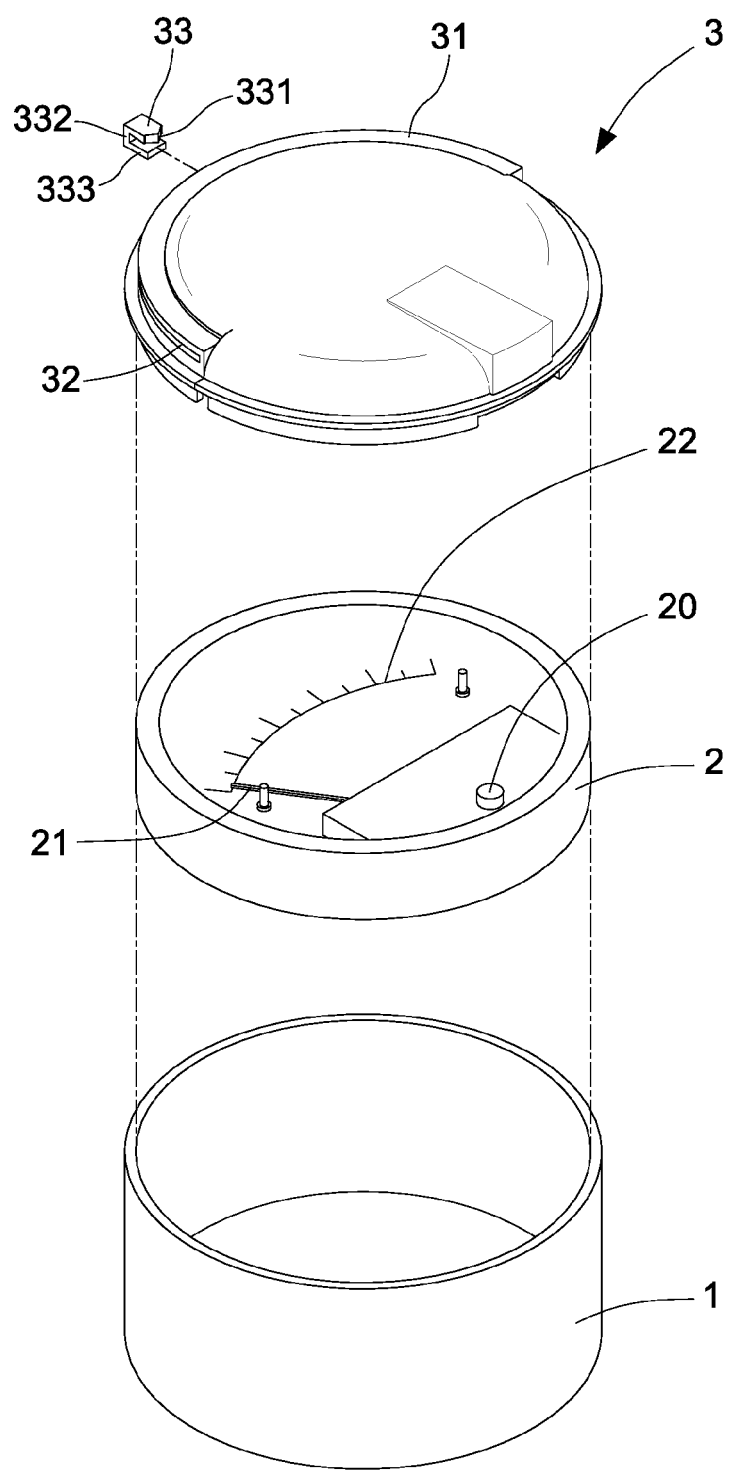
FIG. 1 is an exploded view according to a first embodiment of the present invention.
Figure 2:
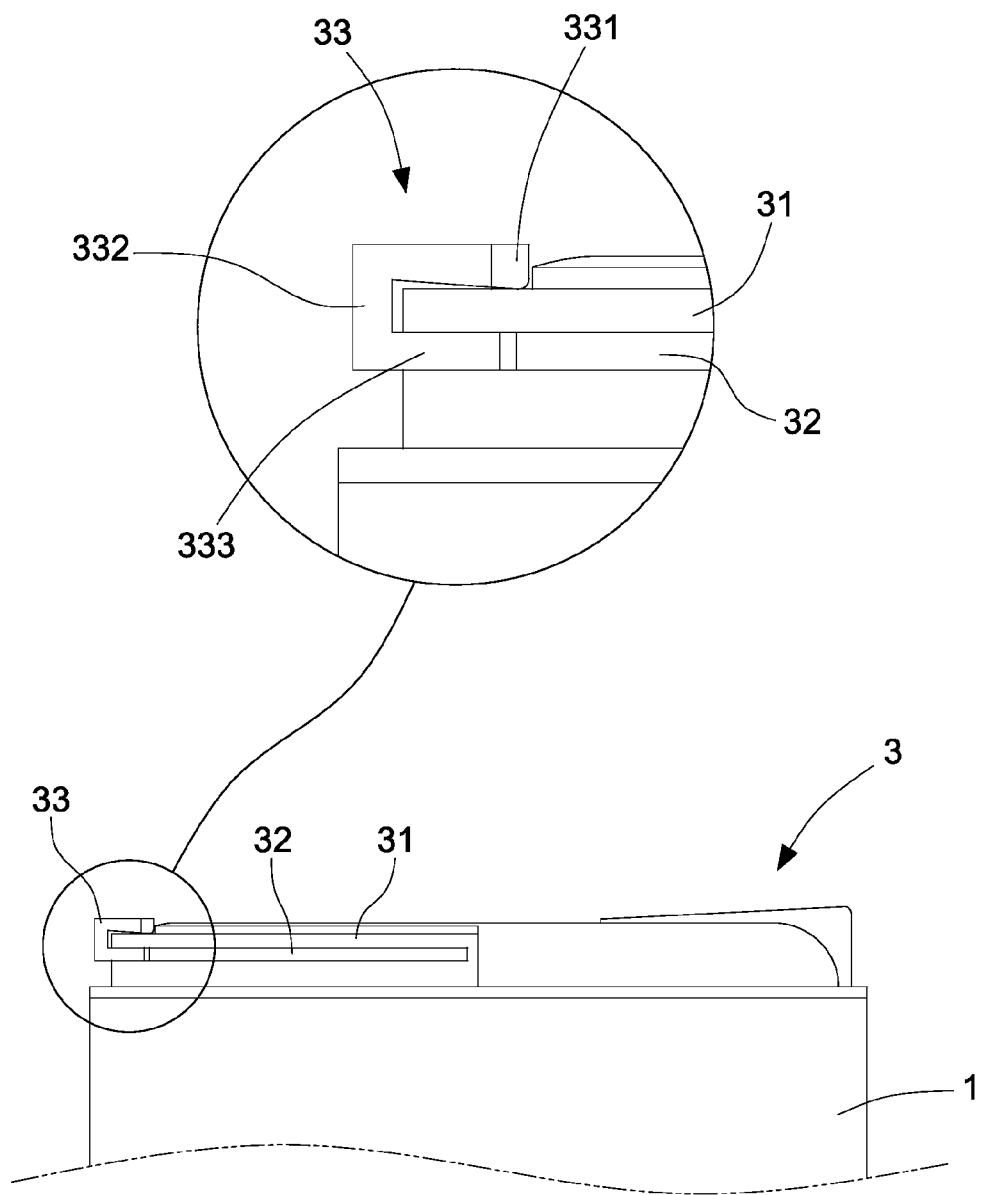
FIG. 2 is a cross-sectional view according to the first embodiment of the present invention.

As shown in FIG. 1 and FIG. 2, a pointer gauge surface structure with a movable alarm adjustment mark according to a first embodiment of the present invention comprises a gauge base 1, a pointer seat 2 and a transparent casing 3.

The gauge base 1 and the pointer seat 2 are incorporated with other parts to become a pointer gauge which may be a pressure gauge or a micro-differential pressure gauge. The pointer seat 2 comprises a pointer 21, axle 20 and a scale plate 22. The pointer 21 carries out an arcuate movement through the axle 20 to display the numerical value on the scale plate 22.

The transparent casing 3 is coupled on the pointer seat 2. A circumferential portion of the transparent casing 3 is provided with a slide rail 31. The slide rail 31 is located in correspondence with the movement range of the pointer 21 and has an arc shape which is equidistant with respect to the axle 20. The transparent casing 3 further has a slide groove 32 formed under the slide rail 31. The slide groove 32 is adapted for engagement of a C-shaped mark member 33. The mark member 33 includes a first board 331, a second board 332 and a third board 333. The first board 331 and the third board 333 are against upper and lower sides of the slide rail 31. The second board 332 is connected between the first board 331 and the third board 333. The distance between the first board 331 and the third board 333 is slightly smaller than the thickness of the slide rail 31. Because the mark member 33 is resilient, the mark member 33 can be coupled to the slide rail 33 securely.

Figure 3:
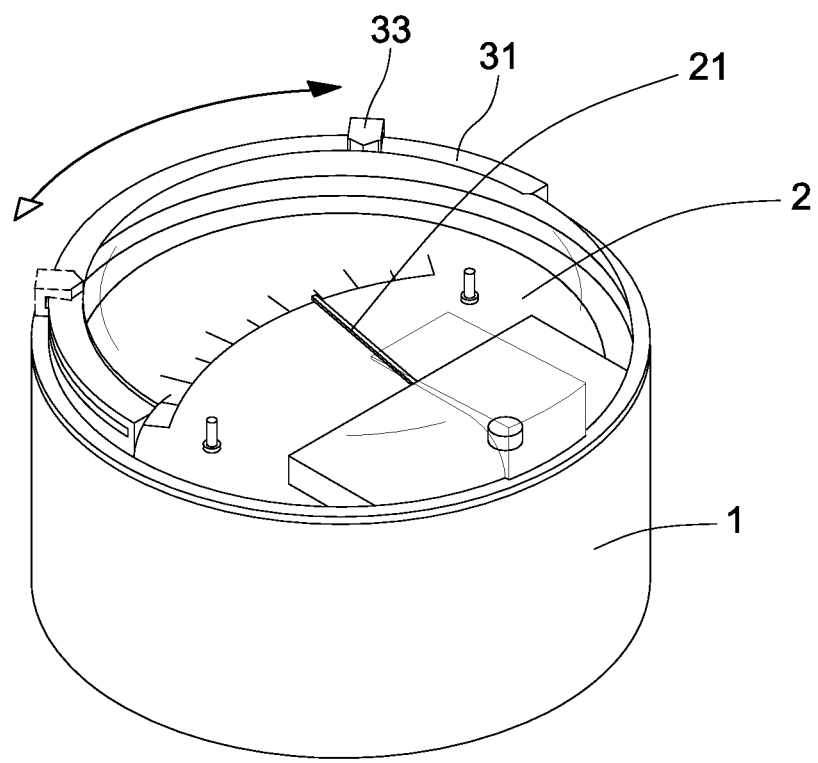
FIG. 3 is a perspective view according to the first embodiment of the present invention when in use.

As shown in FIG. 2 and FIG. 3, when in use, the mark member 33 is secured to the edge of the slide rail 31. With the engagement of the mark member 33, the mark member 33 can be slid along the slide rail 31, without disengagement. Accordingly, when the mark member 33 is moved to a desired position and positioned thereat, the user can read whether the pointer 21 exceeds the predetermined value.

Figure 4:
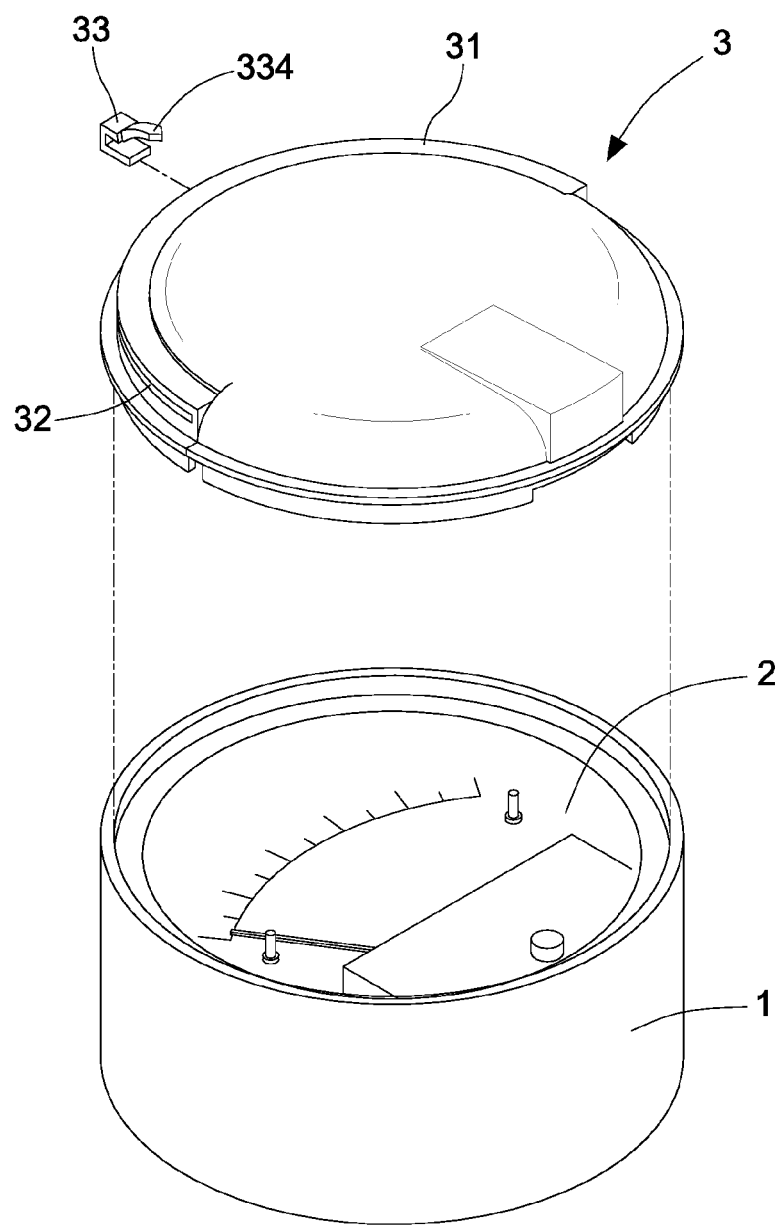
FIG. 4 is an exploded view according to a second embodiment of the present invention.
Figure 5:
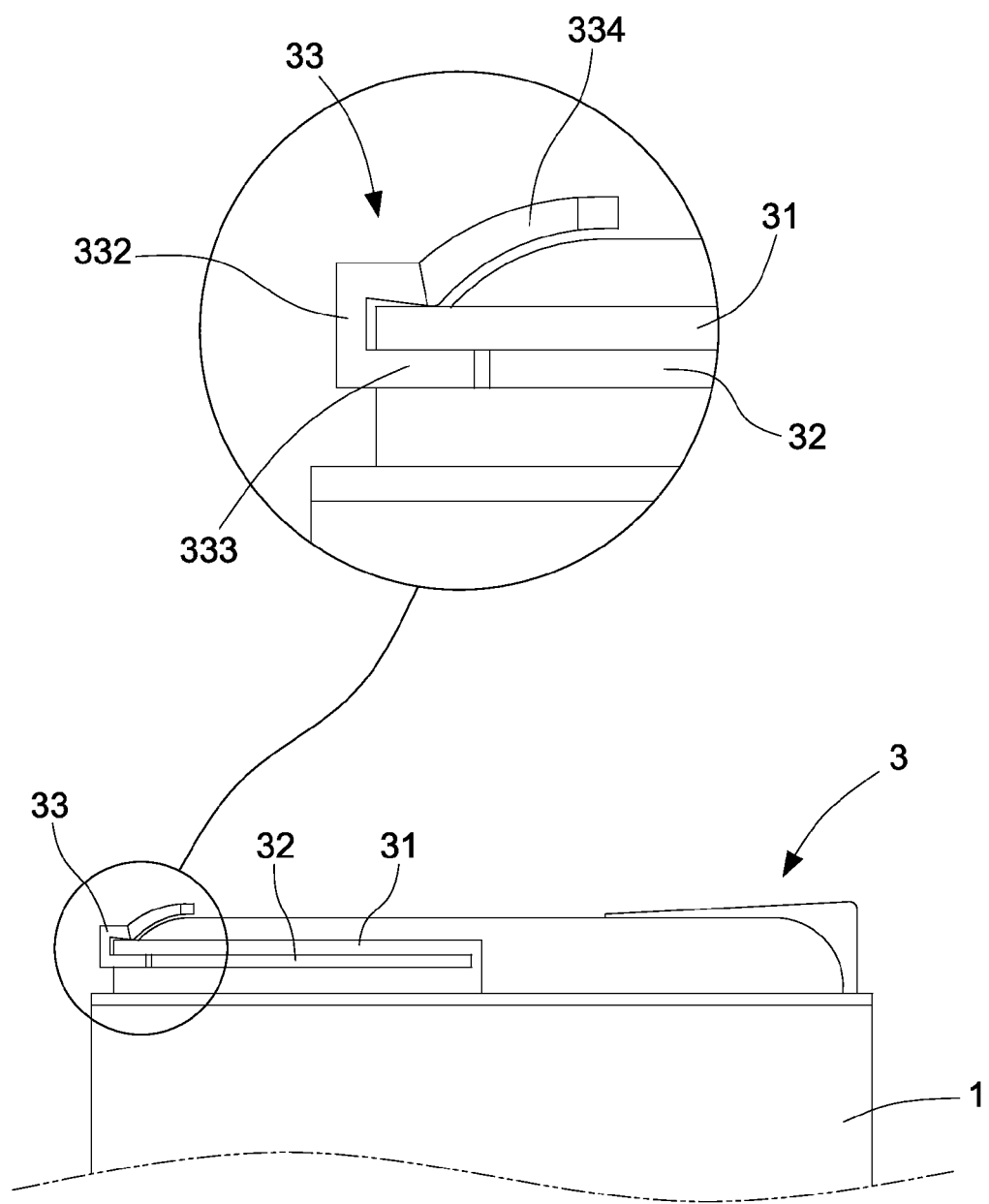
FIG. 5 is a cross-sectional view according to the second embodiment of the present invention.
Figure 6:
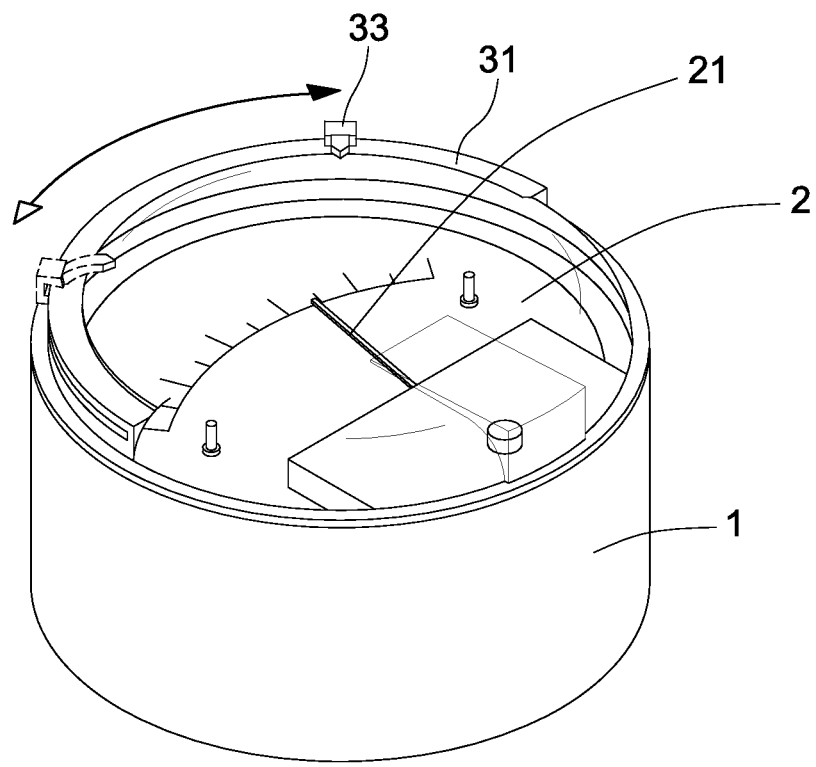
FIG. 6 is a perspective view according to the second embodiment of the present invention when in use.

Referring to FIG. 4 to FIG. 6, the first board 334 is longer than that of the first embodiment, which can facilitate reading.

The mark member 33 is disposed within the gauge surface. Even if the gauge is installed in an embedded way, the mark member 33 of the present invention can carry out its function to improve the limitation of the prior art.

Although particular embodiments of the present invention have been described in detail for purposes of illustration, various modifications and enhancements may be made without departing from the spirit and scope of the present invention.

Accordingly, the present invention is not to be limited except as by the appended claims.

What is claimed is:

1. A pointer gauge surface structure, comprising a pointer seat and a transparent casing;

the pointer seat comprising a pointer, an axle and a scale plate, the pointer carrying out an arcuate movement through the axle to display a numerical value on the scale plate; and the transparent casing being coupled on the pointer seat, an integratedly formed circumferential portion of the transparent casing being provided with a slide groove recessed on a circumferential surface to form a slide rail, the slide rail being located in correspondence with a movement range of the pointer, the slide rail being adapted for engagement of a mark member, wherein the mark member is shaped like an English letter C, the mark member including a first board, a second board and a third board, the first board together with the third board, which is inserted into the slide groove, clamping the slide rail, the second board being connected between the first board and the third board.

2. The pointer gauge surface structure as claimed in claim 1, wherein the slide rail has an arc shape which is equidistant with respect to the axle.

3. The pointer gauge surface structure as claimed in claim 1, wherein the slide rail is disposed around a circumferential portion of the transparent casing.

4. The pointer gauge surface structure as claimed in claim 1, wherein a distance is defined between the first board and the third board and the slide rail has a thickness, the distance being slightly smaller than the thickness of the slide rail.

5. The pointer gauge surface structure as claimed in claim 1, wherein the first board is not parallel to the third board, a distance defined between outer ends of the first board and the third board being smaller than a distance defined between inner ends of the first board and the third board.

6. The pointer gauge surface structure as claimed in claim 1, wherein the mark member is colored.

\* \* \* \* \*